United States Patent [19]

Sera et al.

[11] 4,052,373

[45] Oct. 4, 1977

[54] PROCESS FOR HARDENING GELATIN

[75] Inventors: Hidefumi Sera; Nobuo Yamamoto; Ikutaro Horie; Kameji Nagao, all of Minami-ashigara; Nobuyuki Iwasaki, Fujimiya, all of Japan

[73] Assignee: Fuji Photo Film Co., Ltd., Minami-ashigara, Japan

[21] Appl. No.: 584,231

[22] Filed: June 5, 1975

[30] Foreign Application Priority Data

June 5, 1974 Japan .................................. 49-63731

[51] Int. Cl.[2] .............................................. C09H 5/00

[52] U.S. Cl. ...................................... 260/117; 96/111; 260/2 EN; 526/9; 526/50; 526/52

[58] Field of Search ................ 260/117, 2 EN; 526/9, 526/50, 52; 96/111

[56] References Cited

U.S. PATENT DOCUMENTS 3,770,451 11/1973 Jenkins et al. ........................ 96/135

*Primary Examiner*—Melvyn I. Marquis

*Attorney, Agent, or Firm*—Sughrue, Rothwell, Mion, Zinn and Macpeak

[57] ABSTRACT

A process for hardening, e.g., gelatin, in particular, a gelatin used for photographic light-sensitive materials, which comprises treating gelatin, a non-gelatin hydrophilic high molecular weight material containing primary or secondary amino groups or a composition containing the same with a compound represented by the following general formula (I):

(I)

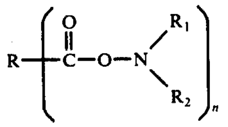

wherein $R_1$ and $R_2$, which may be the same or different, each represents a monovalent residue which is bonded through a carbon atom or a sulfur atom thereof to the nitrogen atom forming the carboxylic acid ester, and $R_1$ and $R_2$ may combine to form a ring structure; R is a divalent or trivalent residue which is bonded through a carbon atom or a nitrogen atom thereof to the carbon atom of the carboxyl group in the carboxylic acid ester, and $n$ is 2 when R is a divalent residue and $n$ is 3 when R is a trivalent residue.

16 Claims, 3 Drawing Figures

FIG. 1 STRUCTURE OF SAMPLE
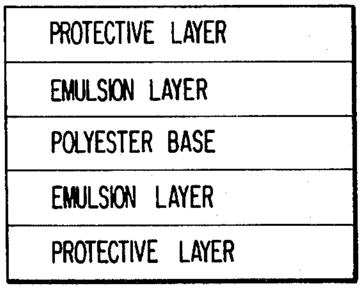
FIG. 2 LAYER STRUCTURE IN SAMPLES
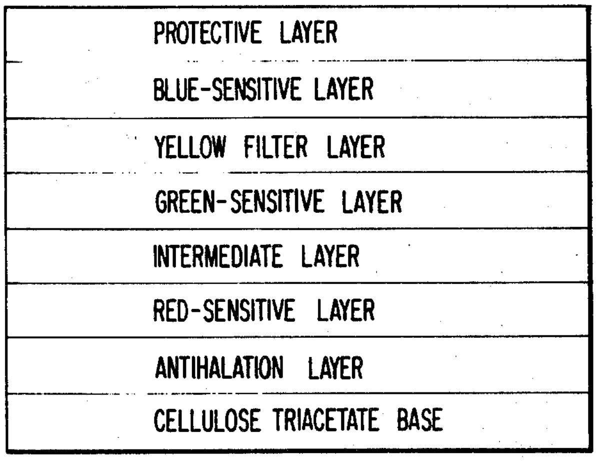
FIG. 3 LAYER STRUCTURE IN SAMPLE
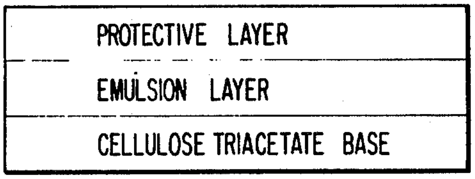

PROCESS FOR HARDENING GELATIN

BACKGROUND OF THE INVENTION

1. FIELD OF THE INVENTION

This invention relates to a process for hardening gelatin and more particularly to a process for hardening gelatin used for photographic light-sensitive materials.

2. DESCRIPTION OF THE PRIOR ART

Gelatin is used as a binder for various photographic light-sensitive materials. For example, gelatin is used as one of the main components constituting a silver halide light-sensitive emulsion layer, a protective layer, a filter layer, an intermediate layer, an antihalation layer, backing layer, a subbing layer on a film support, a baryta layer, and the like.

When light-sensitive materials containing gelatin are processed with various aqueous solutions having different pH's and at different temperatures, layers containing gelatin which has not been treated with a hardening agent swell excessively in the aqueous solutions and are easily damaged since they have poor water resistance. In particular, in aqueous solutions at higher temperatures, e.g., above about 30° C, the gelatin layers may even dissolve and may be leached out in the extreme case.

Various compounds have hitherto been known for effectively hardening gelatin to improve the water resistance, heat-resistance and damage resistance of the gelatin layers. These compounds are well known as hardening agents and are used in the production of photographic light-sensitive materials. Examples of these compounds are aldehyde compounds such as formaldehyde or glutaraldehyde, compounds having reactive halogens as described in U.S. Pat. No. 3,288,775, compounds having reactive ethylenically unsaturated bonds as described in U.S. Pat. No. 3,635,718, aziridine compounds as described in U.S. Pat. No. 3,017,280, epoxy compounds as described in U.S. Pat. No. 3,091,537, halocarboxyaldehydes such as mucochloric acid, dioxanes such as dihydroxydioxane or dichlorodioxane, carboxylic acid esters containing a

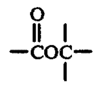

linkage (hereinafter "C- ester") as described in U.S. Pat. Nos. 3,241,972 and 3,542,558, and Japanese Patent Publication No. 48,896/72, and inorganic hardening agents such as chrome alum, chromium sulfate, aluminum sulfate, potassium alum, ammonium alum or zirconium sulfate.

However, each of the above known hardening agents for gelatin has defects, when used in photographic light-sensitive materials: for example, insufficient hardening effects may be obtained; over a long period, changes in the hardening effect with time due to their slow hardening reaction on gelatin may occur, which is referred to as "after-hardening"; undesirable effects on the properties of photographic light-sensitive materials (particularly, such as an increase in fog, a reduction of light-sensitivity or a change in gradation) may occur; their hardening effects may be lost due to the presence of other photographic additives or the effects of other photographic additives such as color couplers for color light-sensitive materials may be decreased; the production of the compounds used as a hardening agent may be so difficult that they are unsuitable for mass production; the hardening agents themselves may be unstable and not be stored well; or the like.

SUMMARY OF THE INVENTION

Accordingly, an object of this invention is to provide a novel hardening agent which hardens gelatin and a non-gelatin hydrophilic high molecular weight material containing primary and/or secondary amino groups (hereinafter both the gelatin and the high molecular weight material will be referred to as gelatin for brevity).

Another object of this invention is to provide a quick and effective hardening agent for gelatin which enables the production of a photographic light-sensitive material having stable properties, that is, in which little changes with time in swelling speed and swelling rate and little changes with time in sensitivity and color balance resulting therefrom occur.

A further object of this invention is to provide a novel hardening agent for gelatin which shows excellent water resistance, heat resistance and damage resistance with no undesirable effects on the properties of a photographic light-sensitive material.

The above objects are accomplished by hardening gelatin with a compound represented by the following general formula (I):

(I)

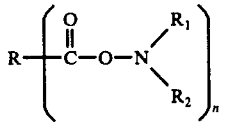

Wherein $R_1$ and $R_2$, which may be the same or different, each represents a monovalent residue which is bonded through a carbon atom or a sulfur atom thereof to the nitrogen atom forming the carboxylic acid ester, $R_1$ and $R_2$ may combine to form a ring structure; R is a divalent or trivalent residue which is bonded through a carbon atom or a nitrogen atom thereof to the carbon atom of the carboxyl group in the carboxylic acid ester; and *n* is 2 when R is a divalent residue and *n* is 3 when R is a trivalent residue.

BRIEF DESCRIPTION OF THE DRAWINGS

FIG. 1-3 show the layer structure of silver halide photographic samples used in the Examples.

DETAILED DESCRIPTION OF THE INVENTION

In regard to the hardening agent used in this invention (containing a

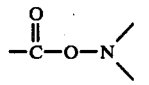

linkage (hereinafter, "N-ester")), since hardening proceeds rapidly and since substantially no afterhardening phenomenon occurs, a photographic light-sensitive material produced using this hardening agent maintains a constant hardening degree for the gelatin immediately after it has been produced. Therefore, when a light-sensitive material immediately after production and a light-sensitive material after storage are compared with each other, no difference in the penetrating rate of, for example, a developing agent during processing, resulting in no difference in apparent sensitivity and color balance, are observed.

The reaction of hardening gelatin is completed more quickly with C-esters, which have a chemical structure similar to the structure of the gelatin hardening agent used in this invention as compared with other gelatin hardening agents, but several days are required to complete the hardening of gelatin. Therefore, when C-esters are used as hardening agents in layers of a photographic light-sensitive material, an after-hardening phenomenon occurs. As is evident from the above, the gelatin hardening agent used in this invention is quite different in terms of its effects from known gelatin hardening agents of C-esters having a similar chemical sturcture and further from other gelatin hardening agents.

Moreover, the hardening agent of this invention exhibits a high hardening effect and, in spite of the reactivity, it is stable and can be stored well.

There are no harmful interactions between the hardening agent of this invention and other co-existing photographic additives, such as color couplers for color light-sensitive materials, that is, the effects of other photographic additives are not diminished by the hardening agent of this invention and its hardening effect is not lost. In addition, the hardening agent of this invention has no undesirable effects on the properties of photographic light-sensitive materials (particularly an increase in fog, a reduction of light-sensitivity, etc.).

The hardening agent of this invention can be used to harden not only gelatin but also other materials such as hydrophilic high molecular weight materials having primary or secondary amino groups as in gelatin, for example, non-gelatin materials such as polyethyleneimine, poly(ethylene-4-amino-1,2,4-triazole), β-aminoacrylic acid-ethylene-maleic acid copolymers, vinylamine-acrylic acid copolymers, or the like, and mixtures of gelatin and other hydrophilic high molecular weight materials.

In the above general formula (I), suitable examples of monovalent residues represented by $R_1$ and $R_2$ include an alkyl group (e.g., having 1 to 6 carbon atoms such as a methyl, ethyl, etc., group), an aryl group (such as a phenyl, etc., group) an alkylcarbonyl group (e.g., having 2 to 7 carbon atoms such as an acetyl, propionyl, etc., group), an arylcarbonyl group (such as a benzoyl, etc., group), an alkylsulfonyl group (e.g., having 1 to 6 carbon atoms in the alkyl moiety thereof, such as a methylsulfonyl, ethylsulfonyl, etc., group) and an arylsulfonyl group (such as a phenylsulfonyl group).

Suitable examples of rings formed when $R_1$ and $R_2$ combine include rings containing carbon, nitrogen, oxygen and sulfur atoms, such as 1-piperidinyl, morpholino, 2-pyrrolidon-1-yl, succinimido, 1,2,3-benzotriazol-1-yl, 4-oxo-3,4-dihydro- 1,2,3-benzothiazin-3-yl, 5-norborene-2,3-dicarboximido, etc.

More specifically, in the above general formula (I), it is preferred that $R_2$ is a

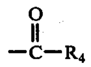

group or an $-R_4$ group when $R_1$ represents

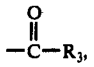

and that

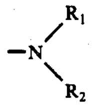

is a 1,2,3-benzotriazol-1- yl group or a 4-oxo-3,4-dihydro-1,2,3-benzotriazin-3-yl group. In the above groups, $R_3$ and $R_4$, which may be the same or different, each represents a monovalent residue. Moreover, $R_3$ and $R_4$ may combine to form a 5- or 6-membered mononuclear ring, an 8- to 13-membered condensed ring or a ring containing a bridging group. Suitable examples of monovalent residues for $R_3$ and $R_4$ include an alkyl group (e.g., having 1 to 5 carbon atoms such as a methyl, ethyl, etc., group), and an aryl group (such as a phenyl, etc., group). Suitable examples of rings formed when $R_3$ and $R_4$ combine are as described above for $R_1$ and $R_2$. In all of the above cases, substituents can be present on the various recited groups. Suitable substituents include a halogen atom (such as a chlorine, bromine, etc., atom), an alkoxy group (e.g., having 1 to 4 carbon atoms such as a methoxy, ethoxy, etc., group), an alkoxycarbonyl group (e.g., having 2 to 5 carbon atoms such as a methoxycarbonyl, etc., group), a carbamoyl group (e.g., having 1 to 5 carbon atoms such as a methylcarbamoyl, etc., group), a carboxy group, a sulfo group or an alkali metal salt (e.g., a sodium, potassium, etc., salt) or a tertiary amine salt (e.g., a triethylamine, etc., salt) of a carboxy or sulfo group. Suitable aryl group substituents can be an alkyl group (e.g., having 1 to 4 carbon atoms). R is a divalent or trivalent residue of an acyclic straight or branched chain group, a 5- or 6-membered mononuclear ring, a 7- to 10-membered condensed ring or a ring containing a bridging group, or of these rings containing branched chains as substituents. Suitable examples of groups for R in the above general formula (I) include an alkylene group (e.g., having 1 to 8 carbon atoms and including straight chain and branched chain alkylene groups such as a tetramethylene, octamethylene, 2,2-dimethyltrimethylene, etc., group), an arylene group (e.g., having 6 to 10 carbon atoms such as a p-phenylene, m-phenylene, 1,3,5-benzenetriyl, etc., group), a divalent group containing one or more hetero atoms such as an oxygen, nitrogen and/or sulfur atom, (e.g., $-NH(CH_2)_6NH-$, $-CH_2OCH_2-$, $-CH_2CH_2SO_2CH_2CH_2-$, pyridin-3,5-diyl, dioxan-2,6-diyl). In all of the above cases, the substituents as described above can be present on the various groups recited.

Preferred examples of

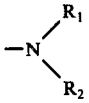

and R in the above-described general formula (I) are set forth below and not only are the following specific examples suitable but also any isomers thereof are also suitable.

Specific examples of

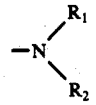

include 1-pyrrolidinyl, 1-piperidinyl, morpholino, 2-isoindolinyl, 1H-indazol:1-yl, 4- oxo-3,4-dihydro-3-quinazolinyl, 4-oxo-3,4-dihydro-1,2,3-benzotriazin-3-yl, 1-pyrazolyl, 1,2,3-benzotriazol -1-yl, 1,2,3- naphthotriazol-1-yl, phthalimido, $\Delta^1$-tetrahydrophthalimido, cyclohexane-1,2-dicarboximido, 5-norbornene-2,3-dicarboximido, succinimido, maleimido, glutarimido, N,N-diacetylamino, N,N- dibutylamino and N-acetyl-N-benzoylamino. Suitable specific examples also include the above residues which are further substituted with an alkyl group such as a methyl or ethyl group, a carboxyl group, a sulfo group, an unsubstituted carbamoyl group or a carbamoyl group substituted with a methyl, ethyl, etc., group, an unsubstituted sulfamoyl group or a sulfamoyl group substituted with a methyl, ethyl, etc., group, a halogen atom such as a chlorine or bromine atom, and the like. Specific examples of such substituted residues are 6-carboxy-1,2,3- benzotriazol-1yl, 6-sulfo-1,2,3-benzotriazol-1yl, 5-chloro- 1,2,3-benzotriazol-1-yl, 4-carboxyphthalimido, sulfosuccinimido and aspartimido groups.

Specific examples of R include a polymethylene group such as ethylene, tetramethylene or octamethylene, propylene, 1,2-dimethylene, vinylene, methylene-ethylene, ethynylene, propenylene, p-phenylene, 1,3,5-benzenetriyl, 1,2,4,5-benzene tetrayl, 1,4-cyclohexanediyl, 1,3-cyclopentanediyl, (1,3-cyclohexanediyl)-dimethylene, dioxane-2,6diyl, pyridine-3,5-diyl, tetramethylenediimino ($-NH-(CH_2)_4-NH-$), hexamethylenediimino, (1,4-cyclohexanediyl)diimino

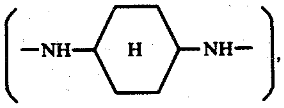, 2-methyl-2- azatrimethylene, oxybis(methyleneimino), (1,4-diazoniabicyclo-[2,2,2]octane-1,4-diyl)dimethylene, oxydimethylene and oxydiethylene groups. Specific examples also include the above divalent or trivalent residues which are further substituted with a carboxyl group, a sulfo group, and the like, and specific examples thereof are 5-carboxy-1,3-phenylene, 5-sulfo-1,3-phenylene and 5-carboxy- 1,3-cyclohexanediyl groups.

All of the hardening agents of this invention are novel compounds and can be synthesized using known reactions in high yield. For example, the corresponding polyvalent carboxylic acid can be reacted with the corresponding alcohol using a dehydrating agent such as dicyclohexycarbodiimide, 1-ethoxycarbonyl-2-ethoxy-1,2-dihydroquinoline, an isonitrile, etc.; the corresponding polyvalent carboxylic acid halide can be reacted with the corresponding alcohol or a metal salt thereof through a dehydrohalogenation or a dehalogenation; or the corresponding polyvalent isocyanate can be subjected to an addition reaction with the corresponding alcohol. Suitable reaction temperatures which can be used range from about −40° to +90° C and suitable molar ratios of reactants which can be used range from about 1:1 to 1:2 of the carboxylic acid, halide or isocyanate to the alcohol. Suitable solvents which can be used include aprotic solvents such as benzene, acetone, chloroform, ethyl acetate, acetonitrile, etc. When the reaction is of the corresponding carboxylic acid halide with the corresponding alcohol or metal salt thereof a hydrogen halide removing agent such as triethylamine, pyridine, 1,4- diazabicyclo[2,2,2-]undecene, etc., is employed.

The polyvalent carboxylic acids or isocyanates as starting materials for the production of the compounds of this invention are well-known compounds and include those used in the Synthetic Examples described hereinafter, as well as aliphatic dicarboxylic acids such as succinic acid, glutaric acid, pimelic acid, suberic acid, azelaic acid, sebacic acid, maleic acid, itaconic acid or acetylenedicarboxylic acid; polyvalent carboxylic acids having a carbon ring such as phthalic acid, isophthalic acid, terephthalic acid, trimellitic acid, pyromellitic acid or 1,4-cyclohexanedicarboxylic acid; and polyvalent carboxylic acids having a nitrogen or oxygen atom such as dioxane-2,5-dicarboxylic acid, dioxane-2,6- dicarboxylic acid, N-methyliminodiacetic acid, dinicotinic acid or diethyleneetherdicarboxylic acid.

The alcohols as the other starting material used include N-hydroxy-5-norbornene-2,3-dicarboxylic acid imide, N-hydroxy succinimide, 1-hydroxy-1,2,3-benzotriazole, N-hydroxyphthalimide, 1-hydroxy-1,2,3-benzotriazole-6-sulfonic acid and 1-hydroxy-1,2,3-benzotriazole-6-carboxylic acid, which are used for the production of illustrative compounds of this invention as shown hereinafter, as well as N-hydroxypiperidine, $\Delta^1$-N-hydroxytetrahydropthalimide, N-hydroxyglutarimide, -N-hydroxymorpholine, 3-hydroxy-4-oxo-3,4-dihydroquinazoline, 3-hydroxy-4-oxo-2-methyl-3,4-dihydroquinazoline, 3-hydroxy-4-oxo-3,4-dihydro-1,2,3-benzotriazine, 5-chloro-1-hydroxybenzotriazole, 1-hydroxybenzotriazole-sulfonic acid-(6)- amide, 1-hydroxybenzotriazole-sulfonic acid-(6)-diethylamide and 1-hydroxy-5-methylbenzotriazole.

Specific examples of the compounds of the general formula (I) used in this invention are set forth below, but the invention is not to be construed as being limited to these compounds.

Compound (1)

N,N'-Adipoyldioxydi(5-norbornene-2,3-dicarboxylic acid imide)

Compound (2)

N,N'-Adipoylidioxydisuccinimide

Compound (3)

1,1'-Adipoyldioxydi(1,2,3-benzotriazole)

Compound (4)

N,N'-Hexamethylenebis(iminocarbonyloxy)disuccinimide

Compound (5)

N,N',N''-(1,3,5-Benzenetriyl)tris(carbonyloxy)triphthalimide

Compound (6)

N,N',N''-(1,3,5-Benzenetriyl)tris(carbonyloxy)tris(5-norbornene-2,3-dicarboximide)

Compound (7)

Diglycolic acid di(1,2,3-benzotriazol-1-yl) ester

Compound (8)

5-(Carboxyamino)-1,3,3-trimethylcyclohexane-1-methylcarbamic acid di(1,2,3-benzotriazol-1-yl) ester Compound (9)

N,N'-(1,4-Diazoniabicyclo[2,2,2]octane-1,4-diyl)bis(-methylenecarbonyloxy)disuccinimide dichloride Compound (10)

6,6'-Disulfo-1,1'-adipoyldioxydi(1,2,3-benzotriazole)

Compound (11)

6,6'-Dicarboxy-1,1'-azelaoyldioxydi(1,2,3-benzotriazole)

Compound (12)

N,N-Succinyldioxydi(acetylmethylimide)

Compound (13)

Diglycolic acid di(benzenesulfonyl-methylimide)

The amount of the hardening agent used in this invention can be selected depending upon the purpose. The hardening agent can be generally used in an amount of about 0.1 to 10% by weight, preferably 0.5 to 5% by weight, based on the weight of the dry gelatin. With an amount of more than about 10% by weight of the hardening agent of this invention based on the dry gelatin, it is impossible to form films using an aqueous gelatin solution using, for example, coating or spray coating, since such an aqueous gelatin solution immediately gels and then hardens. On the other hand, with an amount of less than about 0.1% by weight, films can be formed using an aqueous gelatin solution, but sufficient hardening is not obtained after drying, resulting in an unsatisfactory strength. Within the above-described range of the amount of the hardening agent, the hardening agent of this invention well exhibits the property of quickly hardening the gelatin which is one of the features thereof.

The hardening agents of this invention can be used individually or as a mixture of two or more thereof. Moreover, the hardening agents of this invention can be used together with known other hardening agents. Examples of suitable known hardening agents are aldehyde compounds such as formaldehyde or glutaraldehyde; ketone compounds such as diacetyl or cyclopentanedione; compounds having reactive halogen atoms such as bis(2-chloroethylurea), 2-hydroxy-4,6-dichloro-1,3,5-triazine or those as described in U.S. Pat. Nos. 3,288,775 and 2,732,303 or British Pat. Nos. 974,723 and 1,167,207; compounds having reactive olefins such as divinyl sulfone, 5-acetyl-1,3-diacryloylhexahydro-1,3,5-triazine or those as described in U.S. Pat. Nos. 3,635,718 and 3,232,763 or British Pat. No. 994,869; N-methylol compounds such as N-hydroxymethylphthalimide or those as described in U.S. Pat. Nos. 2,732,316 and 2,586,168; isocyanates as described in U.S. Pat. No. 3,103,437; aziridine compounds as described in U.S. Pat. Nos. 3,017,280 and 2,983,611; acid derivatives as described in U.S. Pat. Nos. 2,725,294 and 2,725,295; carbodiimide compounds as described in U.S. Pat. No. 3,100,704; epoxy compounds as described in U.S. Pat. No. 3,091,537; isooxazole compounds as described in U.S. Pat. Nos. 3,321,313 and 3,543,292; halocarboxyaldehydes such as mucochloric acid; dioxane derivatives such as dihydroxydioxane or dichlorodioxane; and inorganic hardening agents such as chrome alum or zirconium sulfate. Moreover, in place of the above-described known hardening compounds, compounds in the form of hardener precursors such as alkali metal bisulfite aldehyde addition compounds, methylol derivatives of hydantoin or primary aliphatic nitroalcohols can be used. When combined with other hardening agents, the hardening agent of this invention can be used in an adequate relative amount depending upon the purpose and while maintaining the superior properties achieved with this invention.

In the photographic light-sensitive materials in which the hardening agent of this invention can be used, the silver halide emulsions are usually prepared by mixing a solution of a water-soluble salt such as silver nitrate with a solution of a water-soluble halogen salt such as potassium bromide in the presence of a solution of a water-soluble high molecular weight material such as gelatin. Silver halides which can be used include silver chloride and silver bromide, as well as mixed silver halides such as silver chlorobromide, silver bromoiodide or silver chlorobromoiodide.

The silver halide grains can be in any shape, e.g., a cubic or octahedral crystal shape, or a mixed crystal shape thereof. There are no particular restrictions on the grain diameter and the average grain size distribution.

The silver halide grains can be prepared using known conventional techniques. It is, of course, advantageous to prepare the grains using the so-called single or double jet method, controlled double jet method, and the like. Moreover, two or more silver halide photographic emulsions, separately prepared, can be mixed.

The crystal structure of the silver halide grains can be uniform throughout the crystal, can have a stratified structure whose interior and outer portion are different, or can be the so-called conversion type as described in British Pat. No. 635,841 and U.S. Pat. No. 3,622,318. In addition, the silver halide grains can be of the type of forming a latent image mainly on the surface of the grains or of the type of forming a latent image in the interior of the grains. These photographic emulsions are described in, for example, C.E.K. Mees & T.H. James, *The Theory of the Photographic Process,* 3rd Ed., Macmillan, New York, (1966); P. Glafkides, *Chimie Photographique,* Paul Montel, Paris, (1957), and the like and can be prepared by various processes such as an ammonia process, a neutral process or an acid process.

The silver halide grains are, after the formation thereof, washed with water to remove water-soluble salts produced as by-products (for example, potassium nitrate when silver bromide is prepared using silver nitrate and potassium bromide) from the system and then subjected to heat treatment in the present of a chemical sensitizer such as sodium thiosulfate, N,N,N'-trimethylthiourea, a gold(I) thiocyanate complex, a gold(I) thiosulfate complex, stannous chloride or hexamethylenetetramine, thereby increasing the sensitivity without coarsening the grains. Conventional methods therefor are described in the above cited literature.

The silver halide emulsions can be chemically sensitized using conventional techniques. Chemical sensitizers include, for example, gold compounds such as chloroaurate salts or auric trichloride as described in U.S. Pat. Nos. 2,399,083, 2,540,085, 2,597,856 and 2,597,915; salts of noble metals such as platinum, palladium, iridium, rhodium or ruthenium as described in U.S. Pat. Nos. 2,448,060, 2,540,086, 2,566,245, 2,566,263 and 2,598,079; sulfur compounds capable of forming silver sulfide by reacting with a silver salt as described in U.S. Pat. Nos. 1,574,944, 2,410,689, 3,189,458 and 3,501,313; stannous salts as described in U.S. Pat. Nos. 2,487,850, 2,518,698, 2,521,925, 2,521,926, 2,694,637, 2,983,610 and 3,201,254; amines; and other reducing compounds.

The photographic emulsion in which the hardening agent of this invention is used can be spectrally sensitized or supersensitized using cyanine dyes such as cyanine, merocyanine or carbocyanine, individually or in admixture, or in combination with, for example, styryl dyes. Such color sensitization techniques are quite well known and are described in, for example, U.S. Pat. Nos. 2,493,748, 2,519,001, 2,997,229, 3,480,434, 3,672,897, 3,703,377, 2,688,545, 2,912,329, 3,397,060, 3,511,664, 3,522,052, 3,527,641, 3,615,613, 3,615,632, 3,617,295, 3,635,721, 3,694,217, 3,615,635 and 3,628,964; British Pat. Nos. 1,195,302, 1,137,580, 1,216,203, 1,242,588, and 1,293,862; German Patent Application (OLS) Nos. 2,030,326 and 2,121,780; and Japanese Patent Publication Nos. 4,936/68, 14,030/69 and 10,773/68. The techniques can be optionally selected depending upon the purpose and application of the light-sensitive material, that is, the wavelength region to be sensitized, the sensitivity, and the like.

Various compounds can be incorporated into the above-described photographic emulsion in order to prevent a reduction of the sensitivity and an occurrence of fog in the production of the light-sensitive material, during the storage thereof or in the course of the processing thereof. A large number of such compounds are known and include, for example, 4-hydroxy-6-methyl-1,3,3*a*,7-tetraazaindene, 3-methylbenzothiazole and 1-phenyl-5-mercaptotetrazole, as well as heterocyclic compounds, mercury-containing compounds, mercapto compounds, metal salts, etc.

Examples of specific compounds which can be used are described in C.E.K. Mees, *The Theory of the Photographic Process, supra,* 344 ~ 349, and the orginial references cited therein and also in the following patents: U.S. Pat. Nos. 1,758,576, 2,110,178, 2,131,038, 2,173,628, 2,697,040, 2,304,962, 2,325,123, 2,394,198, 2,444,605, 2,444,606, 2,444,607, 2,444,608, 2,566,245, 2,694,716, 2,697,099, 2,708,162, 2,728,663, 2,728,664, 2,728,665, 2,476,536, 2,824,001, 2,843,491, 2,886,437, 3,052,544, 3,137,577, 3,220,839, 3,226,231, 3,236,652, 3,251,691, 3,252,799, 3,287,135, 3,326,681, 3,420,668 and 3,622,339; and British Patent Nos. 893,428, 403,789, 1,173,609 and 1,200,188.

Gelatin to which the hardening agent of this invention is applied can be partially replaced, if desired, with colloidal albumin, casein, cellulose derivatives such as carboxymethyl cellulose or hydroxyethyl cellulose, agar, sodium alginate, saccharide derivatives such as starch derivatives, synthetic hydrophilic colloids such as polyvinyl alcohol, poly-N-vinyl pyrrolidone, polyacrylic acid copolymers or polyacrylamide, or the derivatives thereof or the partially hydrolyzed products thereof. Furthermore, the gelatin can be replaced with the so-called gelatin derivatives, i.e., gelatin modified by treating the functional groups contained in the gelatin molecule such as the amino groups, imino groups, hydroxy groups or carboxyl groups with a compound having a group capable of reacting with these functional groups, or graft polymers prepared by grafting the molecular chain of another high molecular weight material to gelatin.

Examples of the compounds which can be used for producing the above-described gelatin derivatives are isocyanates, acid chlorides and acid anhydrides as described in U.S. Pat. No. 2,614,928; acid anhydrides as described in U.S. Pat. No. 3,118,766; bromoacetic acids as described in Japanese Pat. Publication No. 5,514/64; phenylglycidyl esters as described in Japanese Patent Publication No. 26,845/67; vinylsulfone compounds as described in U.S. Pat. No. 3,132,945; N-allylvinylsulfonamides as described in British Pat. No. 861,414; maleinimide compounds as described in U.S. Pat. No. 3,186,846; acrylonitriles as described in U.S. Pat. No. 2,594,293; polyalkylene oxides as described in U.S. Pat. No. 3,312,553; epoxy compounds as described in Japanese Patent Publication No. 26,845/67; acid esters as described in U.S. Pat. No. 2,763,639; and alkane sultones as described in British Pat. No. 1,033,189.

Many descriptions of chain polymers which can be used for grafting to gelatin are given in, for example, U.S. Pat. Nos. 2,763,625, 2,831,767 and 2,956,884, *Polymer Letters,* 5, 595, (1967), *Photographic Science and Engineering,* 9, 148, (1965) and *Journal of Polymer Science,* A-1, 9, 3199, (1971). Furthermore, polymers and copolymers of the so-called vinylic monomers such as acrylic acid, methacrylic acid, derivatives of acrylic acid and derivatives of methacrylic acid such as the esters, amides and nitriles thereof, and styrene can be used widely for this purpose. It is particularly preferred for this purpose to use hydrophilic vinyl polymers which are somewhat compatible with gelatin, for example, polymers or copolymers of acrylic acid, acrylamide, methacrylamide, hydroxyalkyl acrylate, hydroxyalkyl methacrylate, etc.

In the photographic light-sensitive materials in which the hardening agent of this invention is used, the photographic emulsion layers and other layers can also contain synthetic polymer compounds such as a latex of water-dispersible vinyl compound polymers, particularly, compounds increasing the dimensional stability of the photographic materials, as such or as a mixture (of different polymers), or in combination with hydrophilic colloids which are permeable to water. Many of these types of polymers are known and are described in, for example, U.S. Pat. Nos. 2,376,005, 2,739,137, 2,853,457, 3,062,674, 3,411,911, 3,488,708, 3,525,620, 3,635,715, 3,607,290 and 3,645,740, and British Pat. Nos. 1,186,699 and 1,307,373. Of these polymers, copolymers or homopolymers of alkyl acrylates, alkyl methacrylates, acrylic acid, methacrylic acid, sulfoalkyl acrylates, sulfoalkyl methacrylates, glycidyl acrylates, glycidyl methacrylates, hydroxyalkyl acrylates, hydroxyalkyl methacrylates, alkoxyalkyl acrylates, alkoxyalkyl methacrylates, styrene, butadiene, vinyl chloride, vinylidene chloride, maleic anhydride and itaconic anhydride are generally used. If desired, the so-called graft type emulsion-polymerized latices of these vinyl compounds, which are prepared by subjecting them to emulsion polymerization in the presence of a hydrophilic protective colloid high molecular weight material, can be used.

A matting agent can also be present in the photographic light-sensitive materials in which the hardening agent of this invention is used. Matting agents are finely divided particles of water-insoluble organic or inorganic compounds and suitably have an average grain size of about 0.2 to 10 $\mu$, particularly 0.3 to 5 $\mu$. Preferred examples of such organic compounds are water-dispersible vinyl polymers such as polymethyl acrylate, polymethyl methacrylate, polyacrylonitrile, acrylonitrile-$\alpha$-methylstyrene copolymers, polystyrene, styrene-divinylbenzene copolymers, polyvinyl acetate, polyethylene carbonate or polytetrafluoroethylene; cellulose derivatives such as methyl cellulose, ethyl cellulose, cellulose acetate or cellulose acetate propionate; starch, starch derivatives such as carboxystarch, carboxynitrophenylstarch or a urea-formaldehyde-starch reaction product; gelatin hardened with known hardening agents, and a hardened gelatin which is prepared by hardening a gelatin coacervate to form hollow granules of microcapsules. Preferred examples of such inorganic compounds are silicon dioxide, titanium dioxide, magnesium dioxide, aluminium dioxide, barium sulfate, calcium carbonate, silver chloride or silver bromide, and glass. The above matting agents can be used, if desired, individually or as a mixture of different substances.

Couplers can also be present in the photographic light-sensitive materials in which the gelatin hardening agent of this invention is used. In this case, the so-called diffusion-resistant couplers are incorporated in the silver halide emulsion layers. Examples of suitable couplers are yellow forming 4-equivalent or 2-equivalent diketomethylene couplers, for example, the compounds as described in U.S. Pat. Nos. 3,415,652, 3,447,928, 3,311,476 and 3,408,194, compounds as described in U.S. Pat. Nos. 2,875,057, 3,265,506, 3,409,439, 3,551,155 and 3,551,156, compounds as described in Japanese Patent Application (OPI) Nos. 26,133/72 and 66,836/73, etc.; magenta forming 4-equivalent or 2-equivalent pyrazolone or indazolone couplers, for example, compounds as described in U.S. Pat. Nos. 2,600,788, 2,983,608, 3,062,653, 3,214,437, 3,253,924, 3,419,391, 3,419,808, 3,476,560 and 3,582,322, Japanese Patent Publication No. 20,636/70 and Japanese Patent Application (OPI) No. 26,133/72, etc.; cyan forming α-naphthol or phenol couplers, for example, compounds as described in U.S. Pat. Nos. 2,474,293, 2,698,794, 3,034,892, 3,214,437, 3,253,924, 3,311,476, 3,458,315 and 3,591,383, and Japanese Patent Publication Nos. 11,304/67 and 32,461/69, etc. Moveover, the DIR couplers as described in U.S. Pat. Nos. 3,227,554, 3,297,445, 3,253,924, 3,311,476, 3,379,529, 3,516,831, 3,617,291 and 3,705,801, and German Patent Application (OLS) No. 2,163,811 can be used.

The photographic emulsion for the photographic light-sensitive material in which the hardening agent of this invention is used can also contain surface active agents, individually or in admixture. The surface active agents are generally used as a coating aid, but they are sometimes employed for other purposes, for example, for improvement emulsification and dispersion, sensitization and photographic characteristics, for preventing build-up of static charge or adhesion, etc.

These surface active agents can be classified as natural surface active agents such as saponin; nonionic surface active agents such as alkylene oxide compounds, glycerol compounds or glycidol compounds; cationic surface active agents such as higher alkylamines, quaternary ammonium salts, pyridines or other heterocyclic rings, phosphoniums or sulfoniums; anionic surface active agents containing acid groups such as carboxylic acid, sulfonic acid, phosphoric acid, sulfuric ester or phosphoric ester groups; and amphoteric surface active agents such as amino acids, aminosulfonic acids, or sulfuric or phosphoric esters of aminoalcohols.

The surface active agents which can be used are described, e.g., in U.S. Pat. Nos. 2,271,623, 2,240,472, 2,288,226, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) No. 1,942,665 and British Pat. Nos. 1,077,317 and 1,198,450, as well as Ryohei Oda, et al., *Synthesis of Surface Active Agents and Their Application,* Maki Publishing, Tokyo, (1964), A. W. Schwartz and J. W. Perry, *Surface Active Agents,* Interscience Publications, Inc., (1958) and J. P. Sisley, *Encyclopedia of Surface Active Agents,* Vol. 2, Chemical Publishing Company (1964).

The photographic emulsions described hereinbefore are coated on a support of a substantially planar material which undergoes no remarkable change in dimensions during processing, for example, depending upon the purpose on rigid supports such as glass, metal or ceramics or flexible supports. Typical flexible supports are those which are generally used for photographic light-sensitive materials, e.g., cellulose nitrate films, cellulose acetate films, cellulose acetate butyrate films, cellulose acetate propionate films, polystyrene films, polyethylene terephthalate films, polycarbonate films, laminates of these films, thin glass films, baryta-coated papers, papers coated or laminated with a polymer of an α-olefin, particularly that having 2 to 10 carbon atoms, such as polyethylene, polypropylene or ethylene-butene copolymers, synthetic resin films the surface of which is roughened to improve the adhesion to other high molecular weight materials and improve printability as described in Japanese Patent Publication No. 19,068/72, etc.

The supports can be transparent or opaque depending upon the purpose of the light-sensitive material. The transparent supports can be colorless or can be colored with a dye or a pigment. The coloring of transparent supports has hitherto been employed with X-ray films and is also described, e.g., in *J.SMPTE.,* 67, 296, (1958).

Examples of opaque supports include those which are intrinsically opaque, for example, papers, as well as films prepared by adding a dye or a pigment such as titanium oxide to a transparent film, synthetic resin films the surface of which is treated in the manner as described in Japanese Patent Publication No. 19,068/72, and papers or synthetic resin films which are rendered completely light-shielding due to the addition of carbon black, a dye, or the like to the films. If the adhesion between the support and the photographic emulsion layer is insufficient, a layer having good adhesive properties to both the support and the emulsion layer can be provided as a subbing layer. For further improving the adhesive property of the support, the surface of the support can be subjected to a pre-treatment using a corona discharge, an ultraviolet irradiation, a flame treatment, and the like.

Each layer for the photograhic light-sensitive material in which the hardening agent of this invention is used can be coated using various coating methods including dip coating, air-knife coating, curtain coating, spray coating and extrusion coating in which a hopper is used as described in U.S. Pat. No. 2,681,294.

If desired, two or more layers can be coated at the same time according to the techniques as described in U.S. Pat. Nos. 2,761,971, 3,508,947, 2,941,898 and 3,526,528.

Examples of the synthesis of the compounds used in this invention are given below. Unless otherwise indicated herein, all parts, percents, ratios and the like are by weight.

SYNTHESIS EXAMPLE 1

Synthesis of Compound (1)

12 g of N-hydroxy-5-norbornene-2,3-dicarboxylic acid imide and 7 g of triethylamine were dissolved in 250 ml of anhydrous acetone, which was then cooled to 5° C. While stirring, a solution of 6.1 g of adipoyl chloride in 20 ml of acetone was added dropwise thereto. After the completion of the addition, the mixture was stirred at 5° C for 1 hour, the temperature was increased to room temperature (i.e., about 20 ~ 30° C), and then the mixture was further stirred for 3 hours. After the completion of the reaction, the mixture was filtered, and the filtrate was concentrated to obtain white crystals. The crystals were washed with cold water to obtain 12 g of Compound (1).

Melting Point: 209° ~ 209.5° C

Elemental Analysis

Calculated: C, 61.54% H, 5.13%, N, 5.98%.

Found: C, 61.64%, H, 5.16%, N, 5.89%.

SYNTHESIS EXAMPLE 2

Synthesis of Compound (2)

11.5 g of N-hydroxysuccinimide and 7.3 g of adipic acid were dissolved in 300 ml of anhydrous dioxane. Then, while cooling to 10° ~ 12° C, 20.8 g dicyclohexlcarbodiimide dissolved in 50 ml of dioxane was added thereto. The mixture was stirred for 1 hour under the same condition and further stirred at room temperature for 12 hours. Thereafter, the mixture was filtered, and the filtrate was concentrated under reduced pressure to produce a viscous liquid. The liquid was dissolved in a mixed solvent of 200 ml of acetone and 200 ml of dioxane, and about 1.5 liters of hexane was added to precipitate 13 g of a powder having a melting point of 165° ~ 168° C.

Elemental Analysis

Calculated: C, 49.41%, H, 4.71%, N, 8.24%.

Found: C, 49.25%, H, 4.96%, N, 8.14%.

SYNTHESIS EXAMPLE 3

Synthesis of Compound (3)

13.5 g of 1-hydroxy-1,2,3-benzotriazole was dissolved in 400 ml of anhydrous tetrahydrofuran. The mixture was cooled to 0° C, to which 11 g of triethylamine was added. Then, 9.2 g of adipoyl chloride was added dropwise at 0° to 5° C while stirring. After the completion of the addition, the temperature was gradually increased to room temperature, and then the mixture was further stirred for 2 hours. After the completion of the reaction, the mixture was concentrated under reduced pressure to about one half its original volume at a bath temperature less than 40° C, cooled and then filtered. The filtrate was dispersed in 250 ml of cold water, and then quickly filtered and dried to obtain 14.5 g of a white powder having a melting point of 172° C (decomposition).

Elemental Analysis

Calculated: C, 56.84%, H, 4.21%, N, 22.11%.

Found: C, 56.91%, H, 4.23%, N, 22.12%.

SYNTHESIS EXAMPLE 4

Synthesis of Compound (4)

12 g of N-hydroxysuccinimide was dissolved in 200 ml of acetone. The mixture was cooled to 0 ° to 5° C, to which a solution of 8.4 g of hexamethylene diisocyanate in 50 ml of acetone was dropwise added while stirring. The mixture was stirred at 0 ° to 5° C for 30 minutes, the temperature was increased to room temperature, and then the mixture was further stirred for 2 hours. The mixture was concentrated under reduced pressure at a bath temperature of 40° C to produce a white solid. The solid was dissolved in dioxane and re-precipitated with hexane to yield 18 g of a white powder having a melting point of 179 to 181° C.

Elemental Analysis

Calculated: C, 48.24%, H, 5.53%, N,14.07%,

Found : C, 48.54%, H, 5.69%, N, 14.06%,

SYNTHESIS EXAMPLE 5

Synthesis of Compound (5)

6.6 g of trimesyl trichloride, 12.3 g of N-hydroxyphthalimide and 8 g of triethylamine were reacted in the same manner as in Synthesis Example 1 to yield 12 g of a white powder. The melting point thereof was above 240° C as measured in a sulfuric acid bath.

Elemental Analysis

Calculated: C 61.40%, H, 2.33%, N, 6.51%,

Found : C, 61.19%, H, 2.58%, N, 6.55%,

This invention is further explained in greater detail by reference to the following examples.

EXAMPLE 1

Silver halide photographic materials (A) to (D) for X-ray photography having the structure shown in FIG. 1 were prepared by coating, cooling, setting and drying each of the layers of the material in the usual manner. The composition of each layer is shown in Table 1 below. Immediately after drying, Samples (A) to (D) were kept at 25° C and 55% relative humidity for 3 hours, 1 day or 7 days. Thereafter, the melting time was measured. The term "melting time" used herein is the period from the time when the sample was immersed in a 0.2 N sodium hydroxide aqueous solution kept at 60° C to the time when all of the layers containing gelatin in the sample were melted, and the melting time is a measure of the hardening degree. The results obtained of melting time are shown in Table 2 below.

TABLE 1

| | Composition of Each Layer | | | | | | | |
|---|---|---|---|---|---|---|---|---|
| | Emulsion Layer | | | | Protective Layer | | | |
| | Sample (A) | Sample (B) | Sample (C) | Sample (D) | Sample (A) | Sample (B) | Sample (C) | Sample (D) |
| Amount of Binder Coated | Gelatin (2.48 g/m²) | | | | Gelatin (1.70 g/m²) + Sodium Polystyrenesulfonate (average molecular weight: 100,000) (0.25 g/m²) | | | |
| Amount of Silver Coated | 5.00 g/m² | | | | — | | | |
| Composition of Silver Halide | AgI (1.5 mol %) AgBr (98.5 mol %) | | | | — | | | |
| Hardening Agent | Compound* (A) | Compound (B) | Compound (C) | Compound (D) | Compound (A) | Compound (B) | Compound (C) | Compound (D) |
| Amount Added per | 1 g | 0.5 g | 3 g | 2.5 g | 0.8 g | 0.4 g | 2.4 g | 2 g |

TABLE 1-continued

| | Composition of Each Layer | | | | | | | |
|---|---|---|---|---|---|---|---|---|
| | Emulsion Layer | | | | Protective Layer | | | |
| | Sample (A) | Sample (B) | Sample (C) | Sample (D) | Sample (A) | Sample (B) | Sample (C) | Sample (D) |
| 100 g of Binder | | | | | | | | |
| Stabilizing Agent | 1-Phenyl-5-mercaptotetrazole (0.3 g/100 g Ag) | | | | — | | | |
| Coating Aid | — | | | | Saponin (2 g/100 g of binder) | | | |
| Matting Agent | — | | | | Silica Particles (average grain size of 5 μ) 1.5 g/100 g of binder) | | | |

*Compound (A) Mucochloric Acid
Compound (B) 2-Hydroxy-4,6-dichloro-s-triazine sodium salt
Compound (C) 1,3,5-Triacryloyl-hexahydro-1,3,5-triazine
Compound (D) Compound (4) of this invention

TABLE 2

| | Melting Time for Each Sample | | |
|---|---|---|---|
| | Time after Drying | | |
| Sample | 3 Hours | 1 Day | 7 Days |
| | (sec) | (sec) | (sec) |
| (A) | 20 | 45 | 295 |
| (B) | 30 | 400 | 620 |
| (C) | 20 | 40 | 430 |
| (D) | 550 | 555 | 555 |

It is apparent from the results in Table 2 above that the compound of an active N-ester type of this invention exhibits an ideal hardening effect in that the hardening reaction proceeds very quickly as compared with other known hardening agents such as mucochloric acid, 2-hydroxy-4,6-dichloro-s-triazine sodium salt or 1,3,5-triacryloylhexahydro-1,3,5-triazine so that substantially no after-hardening occurs.

EXAMPLE 2

Silver halide light-sensitive materials (A) to (F) for color photography having the layer structure shown in FIG. 2 were prepared by coating, cooling, setting and drying each of the layers in the usual manner. The composition of each layer is shown in Table 3 and Table 4 below. Immediately after drying, Samples (A) to (F) were kept at 25° C and 55% relative humidity (RH) for 2 hours or 2 days, or kept at 50° C and 80% relative humidity for 5 days. Then, the melting time was determined in the same manner as in Example 1. The results obtained for the melting time are shown in Table 5 below.

TABLE 3

| | | Composition of Each Layer | | | | | |
|---|---|---|---|---|---|---|---|
| | | Sample | | | | | |
| Layer | Component | Sample (A) | Sample (B) | Sample (C) | Sample (D) | Sample (E) | Sample (F) |
| Protective Layer | Hardening Agent | (1) g* | (2) g | (1) 3 g | (2) 1.5 g | (2) 3 g | (2) 4.5 g |
| | Coating Aid | | (1) 3 g* | | | | |
| | Matting Agent | | Polymethyl Methacrylate (average grain size of 3 μ) 2 g | | | | |
| Blue-Sensitive Layer | Hardening Agent | (1) 1.2 g* | (1) 2.4 g | (1) 3.6 g | (2) 1.8 g | (2) 3.6 g | (2) 5.4 g |
| | Stabilizing Agent | | (1) 0.42 g** | | | | |
| | Color Coupler | | (1) 45 g** | | | | |
| | Composition of Silver Halide | | AgI (3.3 mol %) + AgBr (96.7 mol %) (2.2 g Ag/m²) | | | | |
| Yellow Filter | Hardening Agent | (1) 1 g* | (1) 2 g | (1) 3 g | (2) 1.5 g | (2) 3 g | (2) 4.5 g |
| | Coating Aid | | (2) 3 g* | | | | |
| | Filter Component | | Yellow Colloidal Silver (0.70 g/m²) | | | | |
| Green-Sensitive Layer | Hardening Agent | (1) 1.2 g* | (1) 2.4 g | (1) 3.6 g | (2) 1.8 g | (2) 3.6 g | (2) 5.4 g |
| | Coating Aid | | (1) 3 g* | | | | |
| | Stabilizing Agent | | (1) 0.60 g** | | | | |
| Green-Sensitive Layer | Sensitizing Dye | | (1) 0.30 g** | | | | |
| | Color Coupler | (2) 37 g** | | | | | |
| | Composition of Silver Halide | | AgI (3.3 mol %) + AgBr (96.7 mol %) (2.2 g Ag/m²) | | | | |
| Intermediate | Hardening Agent | (1) 1 g* | (1) 2 g | (1) 3 g | (2) 1.5 g | (2) 3 g | (3) 4.5 g |
| | Coating Aid | | (1) 3 g | | | | |
| Red-sensitive Layer | Hardening Agent | (1) 1.2 g* | (1) 2.4 g | (1) 3.6 g | (2) 1.8 g | (2) 3.6 g | (2) 5.4 g |
| | Coating Aid | | (1) 3 g* | | | | |
| | Stabilizing Agent | | (1) 0.90 g** | | | | |
| | Sensitizing Dye | | (2) 0.30 g** | | | | |
| | Color Coupler | | (3) 38 g** | | | | |
| | Composition of Silver Halide | | AgI (2 mol %) + AgBr (98 mol %) (3.1 g Ag/m²) | | | | |
| Antihalation Layer | Hardening Agent | (1) g* | (1) 2 g | (1) 3 g | (2) 1.5 g | (2) 3 g | (2) 4.5 g |
| | Coating Aid | | (1) 1 g* | | | | |
| | Antihalation Component | | Black Colloidal Silver (0.36 g/m²) | | | | |

*per 100 g of binder
**per 100 g of Ag

TABLE 4

| | Compound Added to Each Layer | |
|---|---|---|
| Component | Designation | Description |
| Hardening Agent | (1) | Compound (2) of this invention |
| | (2) | 1,3,5-Triacryloylhexahydro-1,3,5-triazine |
| Stabilizing Agent | (1) | 4-Hydroxy-6-methyl-1,3,3a,7-tetraazaindene |
| Sensitizing Dye | (1) | Anhydro-5,5'-diphenyl-9-ethyl-3,3'-di(2-sulfoethyl)oxacarbocyanine hydroxypyridium salt |
| | (2) | Anhydro-5,5'-dichloro-9-ethyl-3,3'-di(3-sulfopropyl)thiacarbocyanine hydroxypyridium salt |
| Coating Aid | (1) | Sodium dodecylbenzenesulfonate |
| | (2) | 2-Sulfonatosuccinic acid bis(2-ethylhexyl) ester sodium salt |
| Color | | |

TABLE 4-continued

| | Compound Added to Each Layer | |
|---|---|---|
| Component | Designation | Description |
| Coupler | | |
| | (1) | 2'-Chloro-5'-[2-(2,4-di-tert-amylphenoxy)-butyramido]-α-(5,5-dimethyl-2,4-dioxo-3-oxazolidinyl)-α-(4-methoxybenzoyl)-acetanilide |
| | (2) | 1-(2,4,6-Trichlorophenyl)-3-(3-[2,4-di-tert-amylphenoxy)acetamido]benzamido)-4-(4-methoxyphenyl)-azo-5-pyrazolone |
| | (3) | 1-Hydroxy-4-(2-acetyl phenyl)azo-N-[4-(2,4-di-tert-amylphenoxy)butyl]-2-naphthamide |

TABLE 5

| | Melting Time for Each Sample | | |
|---|---|---|---|
| | Storage Condition | | |
| | 25° C, 55% RH 2 hours | 25° C, 55% RH 2 days | 50° C, 80% RH 5 days |
| Sample | (sec) | (sec) | (sec) |
| (A) | 410 | 410 | 420 |
| (B) | 525 | 530 | 540 |
| (C) | 560 | 560 | 565 |
| (D) | 10 | 15 | 390 |
| (E) | 10 | 25 | 425 |
| (F) | 20 | 40 | 490 |

It is apparent from the results in Table 5 above that the compound of the active N-ester type of this invention exhibits an ideal hardening effect in that the hardening reaction proceeds very quickly as compared with 1,3,5-triacryloylhexahydro-1,3,5-triazine which is a well-known hardening agent, and once gelatin is hardened, no substantial changes occur thereafter.

EXAMPLE 3

Each of Samples (A) to (F) for a backing layer was coated on a cellulose triacetate support, cooled, set and then dried. The composition of each layer is shown in Table 6 below. After drying, Samples (A) to (F) were kept at 25° C and 60% relative humidity for 40 hours. Then, the samples were immersed in water and heated to determine the temperature at which the layer containing gelatin in the samples began to melt (referred to as "melting point"). The melting point described herein is a measure of the hardening degree. The results obtained for the melting point are shown in Table 7.

TABLE 6

| | Composition of Backing Layer | | | | | |
|---|---|---|---|---|---|---|
| | Sample | | | | | |
| Component | Sample (A) | Sample (B) | Sample (C) | Sample (D) | Sample (E) | Sample (F) |
| Binder | Gelatin (1.5 g/m²) + Polyethyl Acrylate (average molecular weight: 100,000) (0.3 g/m²) | | | | | |
| Hardening Agent* | (1) 0.15 g | (1) 0.5 g | (1) 1 g | (1) 2 g | (1) 5 g | — |
| Matting Agent | Polymethyl Methacrylate (average grain size of 3 μ) (0.3 g) | | | | | |
| Dye | 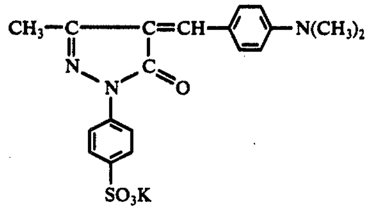 (2.1 g) + 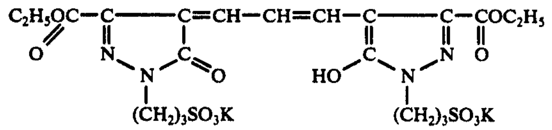 (2.0 g) + 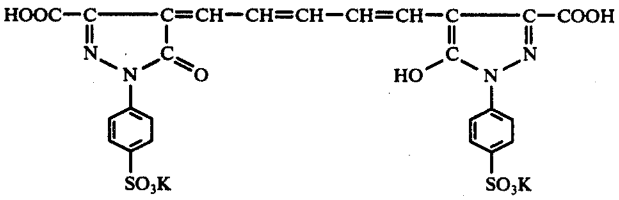 (0.9 g) | | | | | |

*Hardening Agent (1): Compound (1) of this invention
Note:
Amount of all components based on 100 g of the binder.

TABLE 7

| | Melting Point of Sample (° C) | | | | | |
|---|---|---|---|---|---|---|
| | Sample | | | | | |
| | A | B | C | D | E | F |
| Melting Point (° C) | 50 | 71 | 86 | Above 90 | Above 90 | 32 |

As is apparent from the results in Table 7 above, the compound of the active N-ester type of this invention exhibits a hardening effect when used in amounts more than 0.15 g per 100 g of a binder. Furthermore, it can be seen that the hardening effect of the compound of this invention reaches the upper limit when it is employed in an amount of 5 g per 100 g of the binder.

EXAMPLE 4

Silver halide light-sensitive materials (A) and (B) for black-white photography having the layer structure shown in FIG. 3 were prepared by coating, cooling, setting and drying each of the layers in the usual manner. The composition of each layer is shown in Table 8 below. Immediately after drying, Samples (A) and (B) were kept at 25° C and 60% relative humidity for 4 hours, 1 day, 3 days or 14 days. Then, the melting time was determined in the same manner as in Example 1. The results obtained for the melting time are shown in Table 9 below.

TABLE 8

| Composition of Each Layer | | | | |
|---|---|---|---|---|
| | Emulsion Layer | | Protective Layer | |
| | Sample (A) | Sample (B) | Sample (A) | Sample (B) |
| Binder Coated | Gelatin (14.3 g/$m^2$) | | Gelatin (1.70 g/$m^2$) + Sodium Polystyrene-sulfonate (average molecular weight:100,000) (0.20 g/$m^2$) | |
| Silver Coated | 7.0 g/$m^2$ | | — | |
| Silver Halide Composition | AgI (6 mol %) + AgBr (94 mol %) | | — | |
| Stabilizing Agent | 4-Hydroxy-6-methyl-1,3,3a,7-tetrazaindene (0.2 g*) | | — | |
| Sensitizing Dye | Anhydro-5,5'-dichloro-9-ethyl-3,3'-di(3-sulfopropyl)thiacarbocyanine hydroxide pyridinium salt (0.09 g*) + Anhydro-1-(3-sulfopropyl)-1'-ethyl-2,2'-cyanine hydroxide (0.02 g*) | | — | |
| Coating Aid | — | | Sodium N-oleoyl-N-methylaminoethanesulfonate (1.6 g**) | |
| Hardening Agent*** | (1) (2.5 g**) | (2) (2.5 g) | (1) (2.7 g) | (2) (2.7 g) |

*per 100 g of Ag
**per 100 g of binder
***Hardening Agent (1): N,N-dimethylolurea
Hardening Agent (2): Compound (2) of this invention

TABLE 9

| Melting Time for Each Sample | | | | |
|---|---|---|---|---|
| | Time at 25° C and 60% RH | | | |
| | 4 Hours | 1 Day | 3 Days | 14 Days |
| Sample | (sec) | (sec) | (sec) | (sec) |
| (A) | 15 | 40 | 195 | 515 |
| (B) | 555 | 555 | 560 | 560 |

As is apparent from the results in Table 9 above, the compound of the active N-ester type of this invention exhibits an ideal hardening effect in that the hardening reaction proceeds very quickly as compared with N,N-dimethylolurea which is a well-known hardening agent, and once the gelatin is hardened, no substantial changes occur thereafter.

While the invention has been described in detail and with reference to specific embodiments thereof, it will be apparent to one skilled in the art that various changes and modifications can be made therein without departing from the spirit and scope thereof.

What is claimed is:

1. A process for hardening gelatin or a hydrophilic non-gelatin high molecular weight material containing primary and/or secondary amino groups selected from polyethyleneamine, poly(ethylene-4-amino-1,2,4-triazole, β-aminoacrylic acid-ethylene-maleic acid copolymers and vinylamine-acrylic acid copolymers which comprises adding to the gelatin or the high molecular weight material a compound represented by the following general formula (I):

(I)

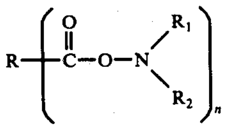

wherein $R_1$ and $R_2$, which may be the same or different, each represents a monovalent residue which is bonded through a carbon atom or a sulfur atom thereof to the nitrogen atom forming the carboxylic acid ester, and $R_1$ and $R_2$ may combine to form a ring structure; R is a divalent or trivalent residue which is bonded through a carbon atom or a nitrogen atom thereof to the carbon atom of the carboxyl group in the carboxylic acid ester; and $n$ is 2 when R is a divalent residue and $n$ is 3 when R is a trivalent residue, wherein the amount of said compound of general formula (I) is from about 0.1% to 10% be weight based on the weight of dry gelatin or the hydrophilic non-gelatin high molecular weight material.

2. The process as claimed in claim 1, wherein $R_2$ is a

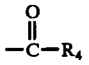

group or an $—R_4$ group when $R_1$ represents a

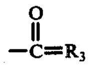

group, wherein $R_3$ and $R_4$, which may be the same or different, each represents a monovalent residue, and $R_3$ and $R_4$ may combine to form a 5- or 6-membered mononuclear ring, an 8- to 13-membered condensed ring or a ring containing a bridging group.

3. The process as claimed in claim 1, wherein R in the general formula (I) represents a divalent or trivalent residue of a straight or branched chain, a 5- or 6-membered mononuclear ring, a 7- to 10-membered condensed ring or a ring containing a bridging group.

4. The process as claimed in claim 1, wherein

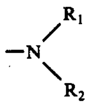

in the general formula (I) is selected from the group consisting of 1-pyrazolyl, 1,2,3-benzotriazol-1-yl, 1,2,3-naphthotriazol-1-yl, phthalimido, $\Delta^1$-tetrahydrophthalimido, cyclohexane, 1,2-dicarboximido, dicarboximido, 5-norbornene-2,3-dicarboximido, succinimido, maleimido, glutarimido, 6-carboxy-1,2,3-benzotriazol-1-yl, 6-sulfo-1,2,3-benzotriazol-1-yl, 5-chloro-1,2,3-benzotriazol-1-yl, 4-carboxyphthalimido, 4-oxo-3,4-dihydro-1,2,3-benzotriazin-3-yl, sulfosuccinimido and aspartimido, and the position isomers thereof.

5. The process as claimed in claim 4, wherein

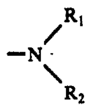

in the general formula (I) is a 1,2,3-benzotriazol-1-yl group or a 4-oxo-3,4-dihydro-1,2,3-benzotriazin-3-yl group.

6. The process as claimed in claim 1, wherein R in the general formula (I) is selected from the group consisting of methylene, ethylene, trimethylene, tetramethylene, pentamethylene, hexamethylene, heptamethylene, octamethylene, propylene, 1,2-dimethylethylene, vinylene, methyleneethylene, ethynylene, propenylene, p-phenylene, 1,3,5-benzenetriyl, 1,2,4,5-benzenetetrayl, 1,4-cyclohexanediyl, 1,3-cyclopentanediyl, (1,3-cyclohexanediyl)dimethylene, dioxane-2,6-diyl, pyridine-3,5-diyl, tetramethylenediimino, hexamethylenediimino, (1,4-cyclohexanediyl)diimino, 2-methyl-2-azatrimethylene, oxybis(methyleneimino), (1,4-diazoniabicyclo[2,2,2]octane-1,4-diyl)-dimethylene, oxydimethylene, oxydiethylene, 5-carboxy-1,3-phenylene, 2-sulfo-1,4-phenylene and 2-sulfo-1,4-cyclohexanediyl, and the position isomers thereof.

7. The process as claimed in claim 1, wherein the compound represented by the general formula (I) is: N,N'-adipoyldioxydi(5-norbornene-2,3-dicarboxylic acid imide), N,N'-adipoyldioxydisuccinimide, 1,1'-adipoyldioxydi(1,2,3-benzotriazole), N,N'-hexamethylenebis(iminocarbonyloxy)disuccinimide or N,N'N''-(1,3,5-benezenetriyl)tris(carbonyloxy)triphthalimide.

8. The process as claimed in claim 1, wherein the compound represented by the general formula (I) is N,N'-adipoyldioxydisuccinimide or N,N'-hexamethylenebis(iminocarbonyloxy)disuccinimide.

9. The process as claimed in claim 1, wherein said process comprises treating gelatin or a gelatin-containing composition with said compound having the general formula (I).

10. The process as claimed in claim 9, wherein the amount of the compound represented by the general formula (I) to the gelatin is an amount of about 0.5 to 5% by weight based on the weight of the dry gelatin.

11. The process according to claim 1, wherein said monovalent residue represented by $R_1$ and $R_2$ is an alkyl group, an aryl group, an alkylcarbonyl group, an arylcarbonyl group, an alkylsulfonyl group, or an arylsulfonyl.

12. The process according to claim 1, wherein when $R_1$ and $R_2$ combine to form a ring structure said rings include 1-piperidinyl, morpholino, 2-pyrrolidon-1-yl, succinimido, 1,2,3-benzotriazol-1-yl, 4-oxo-3,4-dihydro-1,2,3-benzothiazin-3-yl and 5-norbornene-2,3-dicarboximido.

13. The process of claim 1, wherein R is an alkylene group, an arylene group, or a divalent group selected from the class consisting of divalent groups containing one or more hetero atoms from oxygen, nitrogen and/or sulfur.

14. The process as claimed in claim 1, wherein when $R_1$ and $R_2$ combine to form a ring structure the ring structure includes one or more atoms selected from the group consisting of carbon, nitrogen, oxygen and sulfur.

15. The process as claimed in claim 2, wherein when $R_3$ and $R_4$ combine to form a 5- or 6-membered mononuclear ring said ring contains one or more atoms selected from the group consisting of carbon, nitrogen, oxygen and sulfur.

16. The process as claimed in claim 2, wherein said ring is selected from the group consisting of 1-piperidinyl, morpholino, 2-pyrrolidon-1-yl, succinimido, 1,2,3-benzotriazol-1yl, 4-oxo-3,4-dihydro-1,2,3-benzothiazin-3-yl and 5-norbornene-2,3-dicarboximido.

* * * * *